(12) United States Patent
Murayama (10) Patent No.: US 11,339,480 B2
(45) Date of Patent: May 24, 2022

(54) ELECTROLYTIC CELL AND HYDROGEN PRODUCTION APPARATUS

(71) Applicant: Kabushiki Kaisha Toshiba, Minato-ku (JP)

(72) Inventor: Hirotoshi Murayama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 183 days.

(21) Appl. No.: 16/782,126

(22) Filed: Feb. 5, 2020

(65) Prior Publication Data

US 2020/0283916 A1  Sep. 10, 2020

(30) Foreign Application Priority Data

Mar. 6, 2019  (JP) .............................. JP2019-040383
Nov. 25, 2019  (JP) .............................. JP2019-212066

(51) Int. Cl.
| | |
|---|---|
| *C25B 1/04* | (2021.01) |
| *C25B 13/02* | (2006.01) |
| *C25B 15/08* | (2006.01) |
| *C25B 9/73* | (2021.01) |
| *C25B 9/19* | (2021.01) |
| *C25B 11/00* | (2021.01) |
| *C25B 11/073* | (2021.01) |
| *C25B 11/03* | (2021.01) |

(52) U.S. Cl.
CPC .................. *C25B 1/04* (2013.01); *C25B 9/19* (2021.01); *C25B 9/73* (2021.01); *C25B 11/00* (2013.01); *C25B 11/03* (2013.01); *C25B 11/073* (2021.01); *C25B 13/02* (2013.01); *C25B 15/08* (2013.01); *Y02E 60/36* (2013.01)

(58) Field of Classification Search
CPC ......... C25B 1/04; C25B 11/03; C25B 11/031; C25B 11/032; C25B 15/08
See application file for complete search history.

(56) References Cited

U.S. PATENT DOCUMENTS

| | | | |
|---|---|---|---|
| 5,114,547 | A | 5/1992 | Ullman |
| 5,674,365 | A | 10/1997 | Sano |
| (Continued) | | | |

FOREIGN PATENT DOCUMENTS

| | | |
|---|---|---|
| CN | 106574382 A | 4/2017 |
| JP | 3186537 B2 | 7/2001 |
| (Continued) | | |

*Primary Examiner* — Ciel P Contreras
(74) *Attorney, Agent, or Firm* — Oblon, McClelland, Maier & Neustadt, L.L.P.

(57) ABSTRACT

According to one embodiment, an electrolytic cell includes: a housing for retaining an electrolytic solution; a diaphragm that partitions an interior of the housing into an anode-side cell and a cathode-side cell; an anode electrode that is provided in the anode-side cell and has most of a surface in contact with an anode-side gas phase; and a cathode electrode that is provided in the cathode-side cell and has most of a surface in contact with a cathode-side gas phase. According to the other embodiment, a hydrogen production apparatus according to the present embodiment includes: an electrolytic solution tank that retains an electrolytic solution; and a pump that supplies the electrolytic solution between the anode electrode and the cathode electrode from the electrolytic solution tank.

15 Claims, 9 Drawing Sheets

(56) References Cited

U.S. PATENT DOCUMENTS

| | | | |
|---|---|---|---|
| 2013/0337368 A1 | 12/2013 | Doyen et al. | |
| 2016/0215402 A1* | 7/2016 | Takahashi | C02F 1/461 |
| 2018/0305828 A1 | 10/2018 | Takanami et al. | |
| 2019/0145012 A1 | 5/2019 | Murayama | |

FOREIGN PATENT DOCUMENTS

| | | |
|---|---|---|
| JP | 3621858 B2 | 2/2005 |
| JP | 2006-294336 A | 10/2006 |
| JP | 5641501 B2 | 12/2014 |
| JP | 6088048 B2 | 3/2017 |
| JP | 2018-028134 A | 2/2018 |
| JP | 2019-90087 A | 6/2019 |
| WO | WO 2013/185163 A1 | 12/2013 |

\* cited by examiner

FIG. 9

ELECTROLYTIC CELL AND HYDROGEN PRODUCTION APPARATUS

CROSS-REFERENCE TO RELATED APPLICATION(S)

This application is based upon and claims the benefit of priority from Japanese Patent Application No. 2019-40383, filed Mar. 6, 2019 and Japanese Patent Application No. 2019-212066, filed Nov. 25, 2019, the entire contents of which are incorporated herein by references.

TECHNICAL FIELD

Embodiments described herein generally relate to an electrolytic cell and a hydrogen production apparatus.

BACKGROUND

Hydrogen gas can be produced by electrolyzing water using an electrolytic solution. A hydrogen gas production apparatus is required to produce hydrogen gas with increased purity.

DETAILED DESCRIPTION OF EMBODIMENTS

The electrolytic cell according to the present embodiment includes: a housing for retaining an electrolytic solution; a diaphragm that partitions an interior of the housing into an anode-side cell and a cathode-side cell; an anode electrode that is provided in the anode-side cell and has most of a surface in contact with an anode-side space; and a cathode electrode that is provided in the cathode-side cell and has most of a surface in contact with a cathode-side space. The hydrogen production apparatus according to the present embodiment includes: an electrolytic solution tank that retains an electrolytic solution; and a pump that supplies the electrolytic solution between the anode electrode and the cathode electrode from the electrolytic solution tank.

Figure 1:
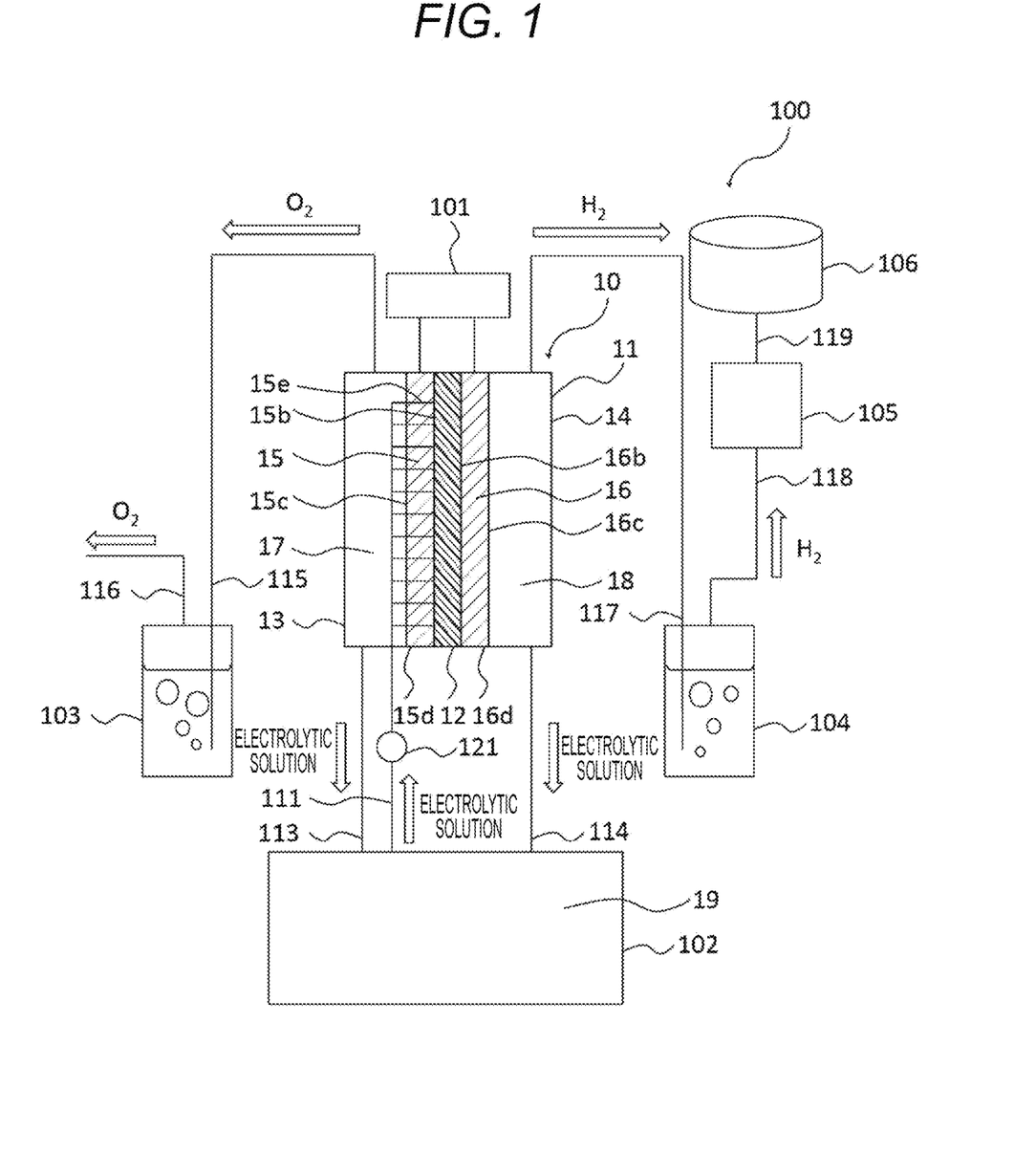
FIG. 1 is a configuration block diagram of a hydrogen production apparatus according to the present embodiment.

FIG. 1 is a configuration block diagram of a hydrogen production apparatus 100 according to the present embodiment.

As shown in FIG. 1, the hydrogen production apparatus 100 according to the present embodiment includes: an electrolytic cell 10; a housing 11, a diaphragm 12, an anode-side cell 13, a cathode-side cell 14, an anode electrode 15, a cathode electrode 16, an anode-side space 17, a cathode-side space 18, an electrolytic solution 19, a rectifier 101, an electrolytic solution tank 102, an oxygen gas cleaning tower 103, a hydrogen gas cleaning tower 104, a compressor 105, a hydrogen storage tank 106, a control unit (not shown), pipes 111 to 119, and pump 121 etc.

In this embodiment, as the electrolytic solution 19, for example, an alkaline electrolytic solution 19 is used. When an alkaline aqueous solution is used as the electrolytic solution 19 in the hydrogen production apparatus 100, it is preferable to use potassium hydroxide having a mass percent concentration of 5% (w/w) or more. It is more preferable to use potassium hydroxide having a mass percent concentration of 20% (w/w) or more and 40% (w/w) or less. However, the alkaline aqueous solution is not limited to an aqueous potassium hydroxide solution and can be a strong alkaline solution such as an aqueous sodium hydroxide solution or an aqueous sodium hypochlorite solution. The electrolytic solution 19 in the hydrogen production apparatus 100 of the present embodiment has high electrical conductivity and high electrolysis efficiency under the above-described conditions.

The housing 11 is provided in the electrolytic cell 10, and the diaphragm 12 is provided in the housing 11. The interior of the housing 11 is partitioned into the anode-side cell 13 and the cathode-side cell 14 by the diaphragm 12. The diaphragm 12 is, for example, a porous film made of a resin material that allows water molecules and ions to pass therethrough but does not allow large air bubbles to pass therethrough. The diaphragm 12 only needs to be formed of an insulating porous material, and may be formed of, for example, a ceramic material.

The pores 12a of the diaphragm 12 are 100 µm or more in size so that water molecules and ions can pass but large air bubbles cannot pass. Preferably, the pore size of the diaphragm 12 is about 500 µm to 1000 µm.

The anode electrode 15 is provided in the anode-side cell 13, and the cathode electrode 16 is provided in the cathode-side cell 14. The anode electrode 15 and the cathode electrode 16 are adjacent to the diaphragm 12, and the anode electrode 15 and the cathode electrode 16 sandwich the diaphragm 12.

The anode electrode 15 is a plate-like body that has a first anode surface 15b and a second anode surface 15c as the back surface of the first anode surface 15b. The anode electrode 15 is disposed with the first anode surface 15b adjacent to the diaphragm 12. There is formed an anode end surface 15d between an end of the first anode surface 15b and an end of the second anode surface 15c. The anode end surface 15d may be a flat surface or a curved surface.

The anode electrode 15 includes an anode opening 15a (not shown in FIG. 1 but will be explained in detail later).

Similarly, the cathode electrode 16 is a plate-like body that has a first cathode surface 16b and a second cathode surface 16c as the back surface of the first cathode surface 16b. The cathode electrode 16 is disposed with the first cathode surface 16b adjacent to the diaphragm 12. There is formed a cathode end surface 16d between an end of the first cathode surface 16b and an end of the second cathode surface 16c. As with the anode end surface 15d, the cathode end surface 16d may be a flat surface or a curved surface.

The cathode electrode 16 includes a cathode opening 16a (not shown in FIG. 1 but will be explained in detail later).

The anode-side cell 13 and the cathode-side cell 14 respectively has an anode-side space 17 and a cathode-side space 18. The spaces 17 and 18 are respectively provided in an opposite side of the electrodes 15 and 16 against the diaphragm 12. The space 17 is essentially filled with an oxygen (O2) of gas phase and the space 18 is essentially filled with a hydrogen (H2) of gas phase, as a result of an electrolysis in the cells 13 and 14 during the operation.

In a bottom of the spaces 17 and 18 in the cells 13 and 14, a very small amount of the electrolytic solution may exist with liquid phase (not shown in the figure). Thus, the oxygen and the hydrogen mainly exist in the spaces 17 and 18 respectively, with being separated from the electrolytic solution. Then the electrolytic solution in the bottoms of the cells 13 and 14 are draw into an electrolytic solution tank 102 via a pipe 113 and a pipe 114 respectively. And the oxygen in the anode-side cell 13 and the hydrogen in the cathode-side cell 14 are draw into the oxygen gas cleaning tower 103 via the pipe 115 and the hydrogen gas cleaning tower 104 via the pipe 117 respectively.

The very small amount of the electrolytic solution 19 in the anode-side cell 13 and the cathode-side cell 14 results from oozing out from between the anode electrode 15 and the cathode electrode 16 into the anode opening 15a of the anode electrode 15 and the cathode opening 16a of the cathode electrode 16 due to surface tension.

That is, the electrolytic solution 19 in the anode-side cell 13 and the cathode-side cell 14 is less than the electrolytic solution 19 between the anode electrode 15 and the cathode electrode 16. In the hydrogen production apparatus 100 according to the present embodiment, the electrolytic solution 19 is not injected into the anode-side cell 13 and the cathode-side cell 14 by intension. This state is defined as a state in which the anode-side space 17 in the anode-side cell 13 and the cathode-side space 18 in the cathode-side cell 14 are "filled" with only gas phase and without liquid phase.

For example, the space 17 in the anode-side cell 13 and the space 18 in the cathode-side cell 14 are filled with the gas phase. Therefore, most part of the second anode surface 15c of the anode electrode 15 (that is, the surface not adjacent to the diaphragm 12) is adjacent to the gas phase, and most part of the second cathode surface 16c of the cathode electrode 16 (that is, the surface not adjacent to the diaphragm 12) is adjacent to the gas phase.

The electrolytic solution 19 in the anode-side cell and the cathode-side cell 14 is less than the electrolytic solution 19 between the anode electrode 15 and the cathode electrode 16. In the hydrogen production apparatus 100 according to the present embodiment, the electrolytic solution 19 is not injected into the anode-side cell 13 and the cathode-side cell 14 by intension. This state is defined as a state in which "the most part" of the second anode surface 15c of the anode electrode 15 (the surface 15c not adjacent to the diaphragm 12) is adjacent to the gas phase.

Similarly, this state is defined as a state in which "the most part" of the second cathode surface 16c of the cathode electrode 16 (the surface 16c not adjacent to the diaphragm 12) is adjacent to the gas phase.

Here, the "surface" of the anode electrode 15 includes at least one of the first anode surface 15b and the second anode surface 15c. Similarly, the "surface" of the cathode electrode 16 includes at least one of the first cathode surface 16b and the second cathode surface 16c. For example, when the plate-like anode electrode 15 or cathode electrode 16 is a rectangular parallelepiped, at least one of the two surfaces having the largest areas among the surfaces of the rectangular parallelepiped constitutes the "surface". Further, of the anode opening 15a and the cathode opening 16a, the wall surface constituting a flow path wall of the electrolytic solution 19 also constitutes a part of the "surface".

Figure 2:
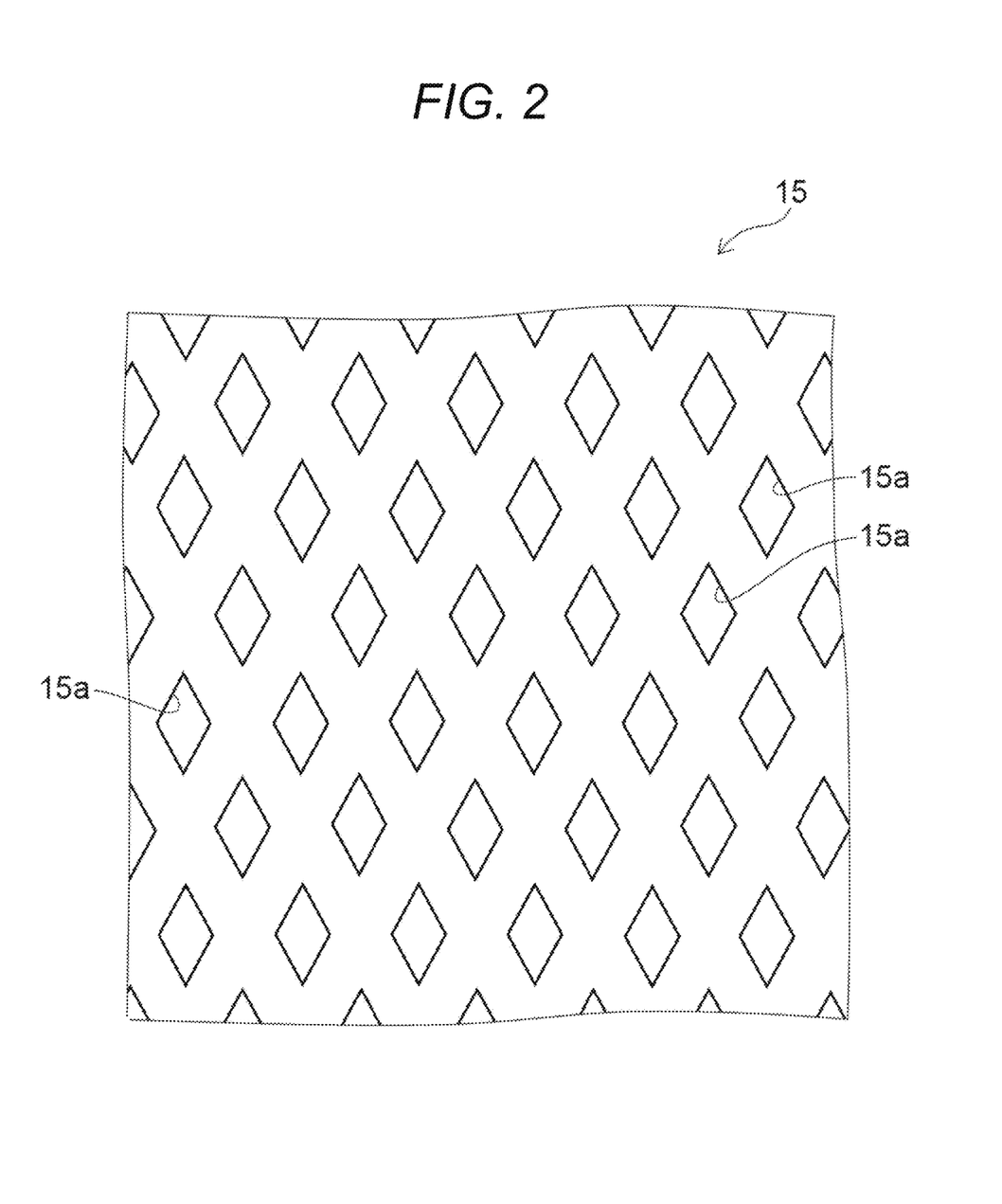
FIG. 2 is a plan view of an example of an anode electrode in the present embodiment.

FIG. 2 is a plan view of an example of the anode electrode 15 in the present embodiment. FIG. 3 is a plan view of an example of the cathode electrode 16 in the present embodiment. As shown in FIG. 2, the anode electrode 15 preferably has a plurality (a large number) of anode openings 15a on the first anode surface 15b and the second anode surface 15c to form a mesh shape. The anode electrode 15 has first anode holes 15e, each of which penetrates between the first anode surface 15b and the second anode surface 15c. That is, as shown in FIG. 2 of the present embodiment, each of the first anode holes 15e has one end opened to the first anode surface 15b and the other end opened to the second anode surface 15c.

Figure 3:
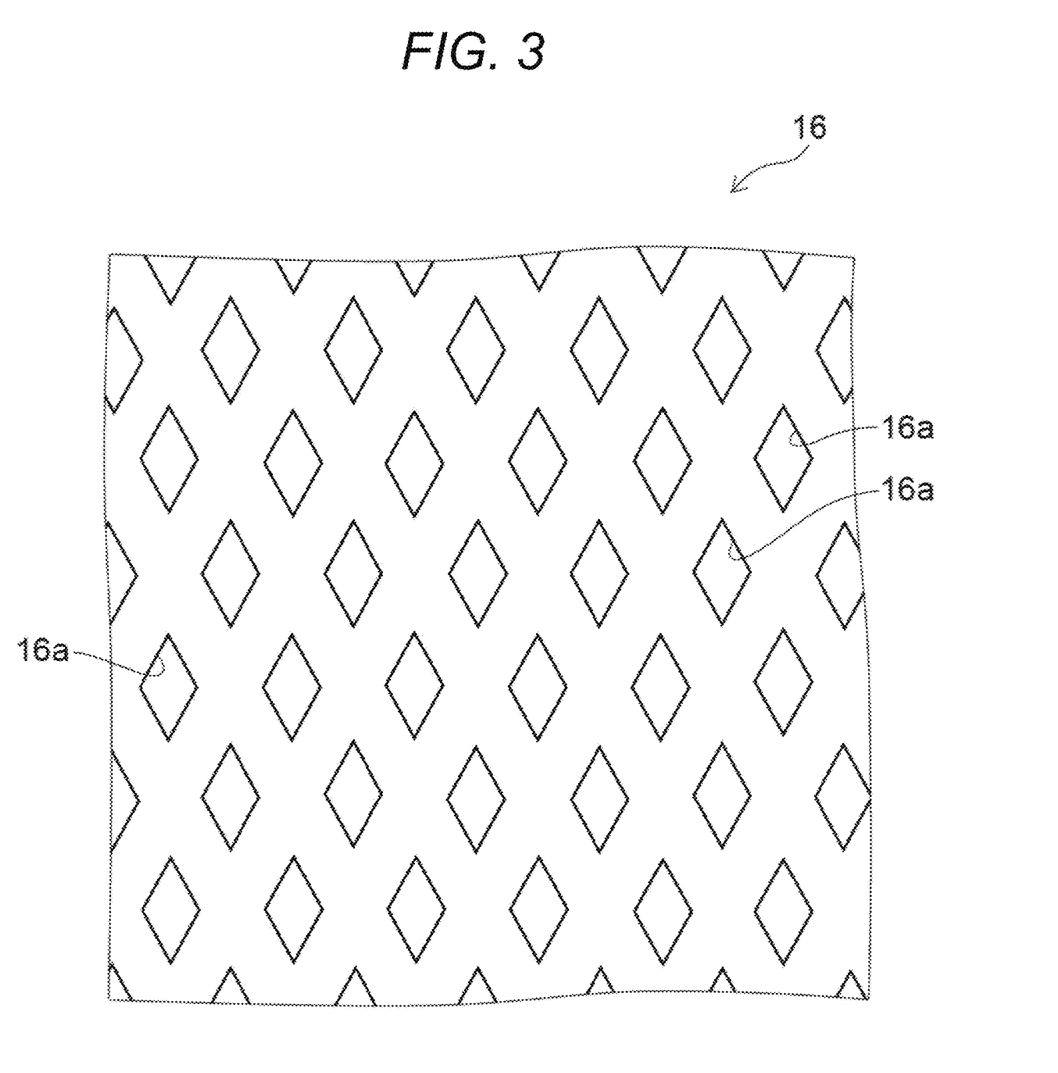
FIG. 3 is a plan view of an example of a cathode electrode in the present embodiment.

Similarly, as shown in FIG. 3, the cathode electrode 16 has a mesh shape similar to that of the anode electrode 15, and the cathode electrode 16 preferably has a plurality (a large number) of cathode openings 16a on the first cathode surface 16b and the second cathode surface 16c. The cathode electrode 16 has first cathode holes 16e, each of which penetrates between the first cathode surface 16b and the second cathode surface 16c. That is, as shown in FIG. 3 of the present embodiment, each of the first cathode holes 16e has one end opened to the first cathode surface 16b and the other end opened to the second cathode surface 16c.

The shape of the anode electrode 15 is not limited to a mesh shape but the anode electrode 15 may have any shape with the first anode holes 15e constituting at least some of the large number of anode openings 15a.

Similarly, the shape of the cathode electrode 16 is not limited to a mesh shape but the cathode electrode 16 may have any shape with the first cathode holes 16e constituting at least some of the large number of cathode openings 16a.

Figure 4:
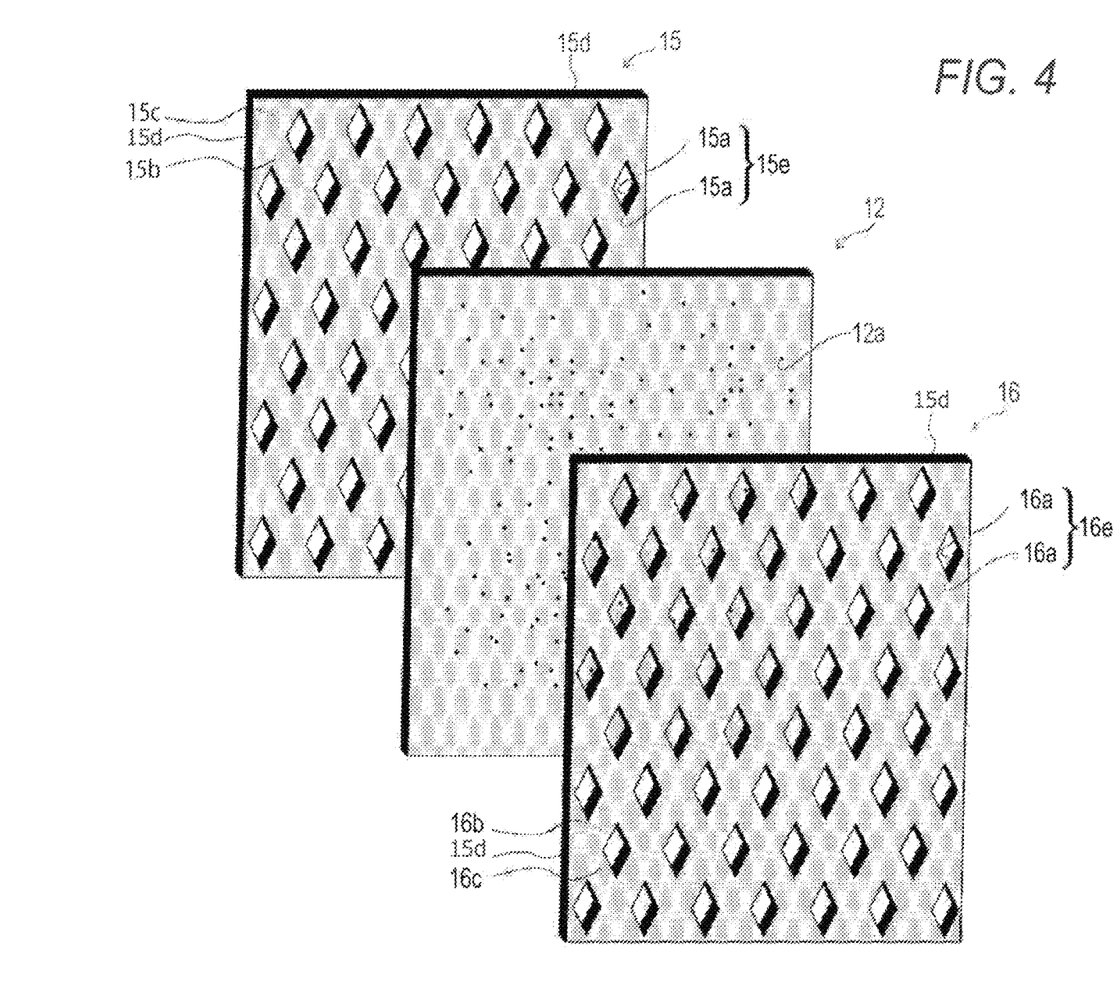
FIG. 4 is a perspective view of a configuration of electrode portions of the hydrogen production apparatus according to the present embodiment.

FIG. 4 is a perspective view of a configuration of electrode portions of the hydrogen production apparatus according to the present embodiment. As shown in FIG. 4, the diaphragm 12 is interposed between the anode electrode 15 and the cathode electrode 16. The anode electrode 15 has the first anode surface 15b in contact with the diaphragm 12, and the cathode electrode 16 has the first cathode surface 16b in contact with the diaphragm 12.

The hydrogen production apparatus 100 has the rectifier 101. The rectifier 101 is supplied with electric power from the outside of the hydrogen production apparatus 100 and applies direct-current power between the anode electrode 15 and the cathode electrode 16.

The hydrogen production apparatus 100 has the electrolytic solution tank 102.

There is a pipe 111 connected between some of the first anode holes 15e, which are at least some of the anode openings 15a opened in the anode electrode 15, and the electrolytic solution tank 102. There is a pump 121 interposed in the middle of the pipe 111.

The term "connection" herein means that two members are mechanically coupled such that a fluid can flow between the interiors of the members.

In the present embodiment, the pipe 111 is connected between some of the first anode holes 15e, which are at least some of the anode openings 15a of the anode electrode 15, and the electrolytic solution tank 102, and the pump 121 is interposed in the middle of the pipe 111. Alternatively, a pipe (not shown) may be connected between some of the first cathode holes 16e, which are at least some of the cathode openings 16a of the cathode electrode 16, and the electrolytic solution tank 102, and a pump (not shown) may be interposed in the middle of the pipe (not shown). Otherwise, all of the pipe 111 etc. and the pump 121 etc. may be provided.

In the present embodiment, the pipe 111 is connected between some of the openings on the second anode surface 15e side of the anode openings 15a of the anode electrode 15 and the electrolytic solution tank 102, and the pump 121 is interposed in the middle of the pipe 111. Thus, the flow path for injecting the electrolytic solution 19 via the pipe 111 and the flow path for discharging the oxygen gas generated by electrolysis of the electrolytic solution 19 are different. As an example of this configuration, the anode electrode 15 may have a gyroidal structure or a lattice structure. The electrolytic solution tank 102 injects the electrolytic solution 19 from some of the anode openings 15a of the anode electrode 15 through the pipe 111 and the pump 121. The diaphragm 12 exists between the anode electrode 15 and the cathode electrode 16, and the anode electrode 15 and the cathode electrode 16 are electrically connected through pores 12a in the diaphragm 12.

The "electrically connected" herein means that electric power is applied to two connected members so that water molecules and ions can flow between the interiors of the members via the electrolytic solution 19.

The electrolytic solution 19 is injected from some of the anode openings 15a of the anode electrode 15, and both the anode electrode 15 and the cathode electrode 16 are in contact with the electrolytic solution 19.

The hydrogen production apparatus 100 includes an oxygen gas cleaning tower 103, a hydrogen gas cleaning tower 104, a compressor 105, and pipes 111 to 119. The electrolytic solution tank 102 retains the electrolytic solution 19 therein. The pipe 111 is connected between the electrolytic solution tank 102 and some of the anode openings 15a of the anode electrode 15.

There is a pump 121 interposed in the middle of the pipe ill. The electrolytic solution tank 102 is disposed below the electrolytic cell 10. The pipe 113 is connected between the lower part, for example, the bottom face of the anode-side cell 13 and the upper part of the electrolytic solution tank 102. The pipe 114 is connected between the lower part, for example, the bottom face of the cathode-side cell 14 and the upper part of the electrolytic solution tank 102.

A pump may be interposed in the middle of the pipes 113 and 114. When the pump is activated, the electrolytic solution 19 accumulated in the lower part of the anode-side cell 13 and the cathode-side cell 14 is discharged to the electrolytic solution tank 102 through the pipes 113 and 114.

However, there is not provided a pump for moving the electrolytic solution 19 from the electrolytic solution tank 102 to the anode-side cell 13 and the cathode-side cell 14.

Therefore, the electrolytic solution 19 does not circulate between the anode-side cell 13 and the cathode-side cell 14 and the electrolytic solution tank 102 but only moves unilaterally from the anode-side cell 13 and the cathode-side cell 14 to the electrolytic solution tank 102, except for the electrolytic solution 19 oozing out from the anode electrode 15 and the cathode electrode 16. The pipe 115 is connected between the upper part of the anode-side cell 13 and the lower part of the oxygen gas cleaning tower 103. The pipe 116 is drawn from the upper part of the oxygen gas cleaning tower 103 to the outside of the hydrogen production apparatus 100. The hydrogen storage tank 106 is provided outside the hydrogen production apparatus 100. The pipe 117 is connected between the upper part of the cathode-side cell 14 and the lower part of the hydrogen gas cleaning tower 104. The pipe 118 is connected between the upper part of the hydrogen gas cleaning tower 104 and the compressor 105. The pipe 119 is connected between the compressor 105 and the external hydrogen storage tank 106.

Figure 5:
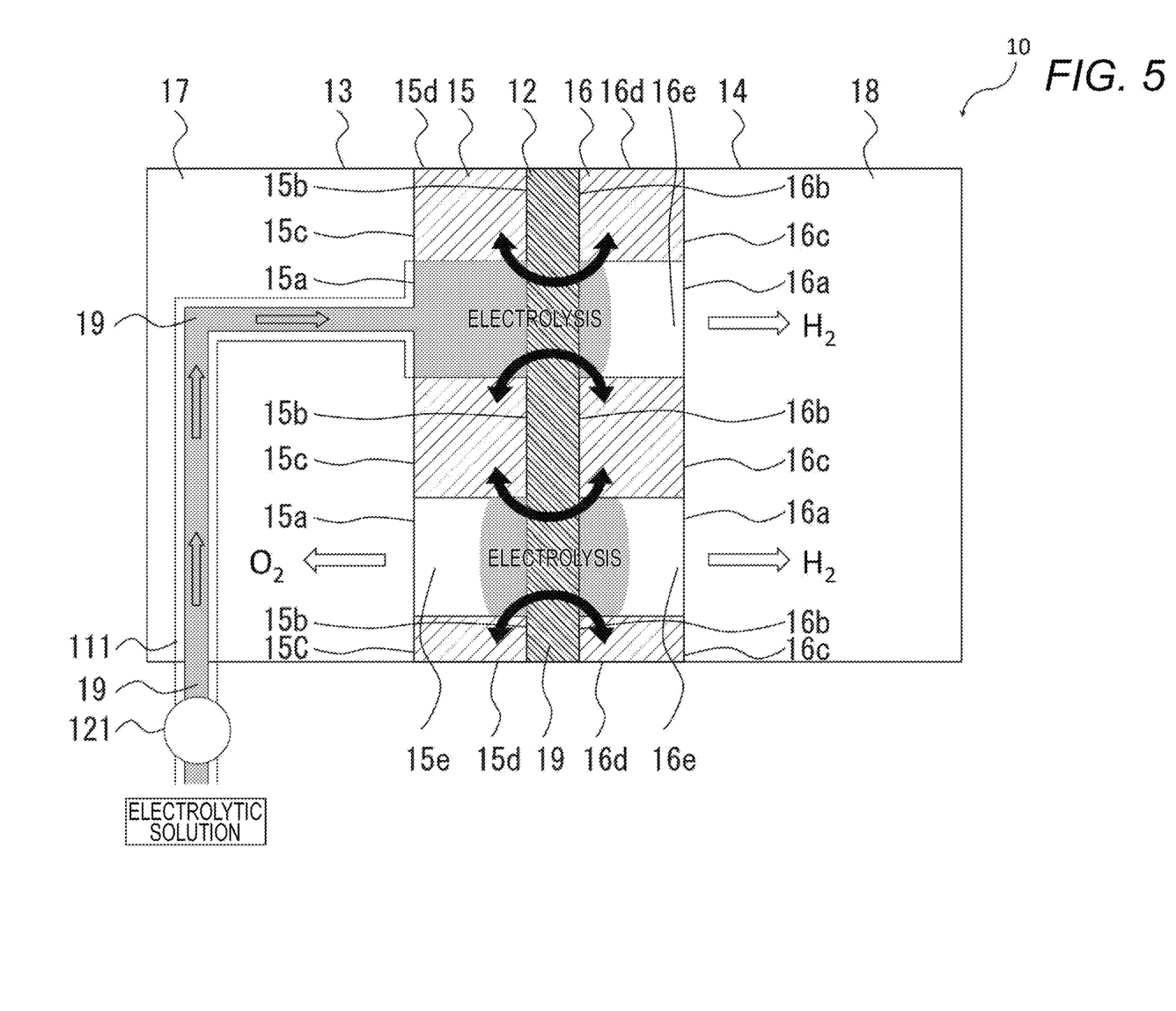
FIG. 5 is an enlarged cross-sectional view of a part of the electrolytic cell in the hydrogen production apparatus according to the present embodiment to explain an operating principle for the electrolytic cell.

FIG. 5 is a cross-sectional view of a configuration and operating principle of the electrolytic cell 10 provided in the hydrogen production apparatus 100 according to the present embodiment. The electrolytic cell 10 includes the housing 11, the diaphragm 12, the anode-side cell 13, the cathode-side cell 14, the anode electrode 15, the cathode electrode 16, the gas phase, the gas phase, the electrolytic solution 19, the pipe 111, and the pump 121.

Referring to FIG. 5, the anode electrode 15 includes the anode openings 15a as anode holes. The anode electrode has preferably a plurality (a large number) of anode openings 15a which are anode holes. Each of the anode openings 15a has one end opened to the first anode surface 15b and the other end opened to the second anode surface 15c.

Similarly, the cathode electrode 16 preferably has a plurality (a large number) of cathode openings which are the cathode holes. Each of the cathode openings 16a has one end opened to the first cathode surface 16b and the other end opened to the second cathode surface 16c.

The pipe 111 has one end connected to the electrolytic solution tank 102 and the other end connected to some of the anode openings 15a on the second anode surface 15c side of the anode electrode 15. The anode openings 15a not connected to the pipe 111 on the second anode surface 15c side of the anode electrode 15 are opened to the anode-side cell 13. There is a pump 121 interposed in the middle of the pipe 111.

Figure 6:
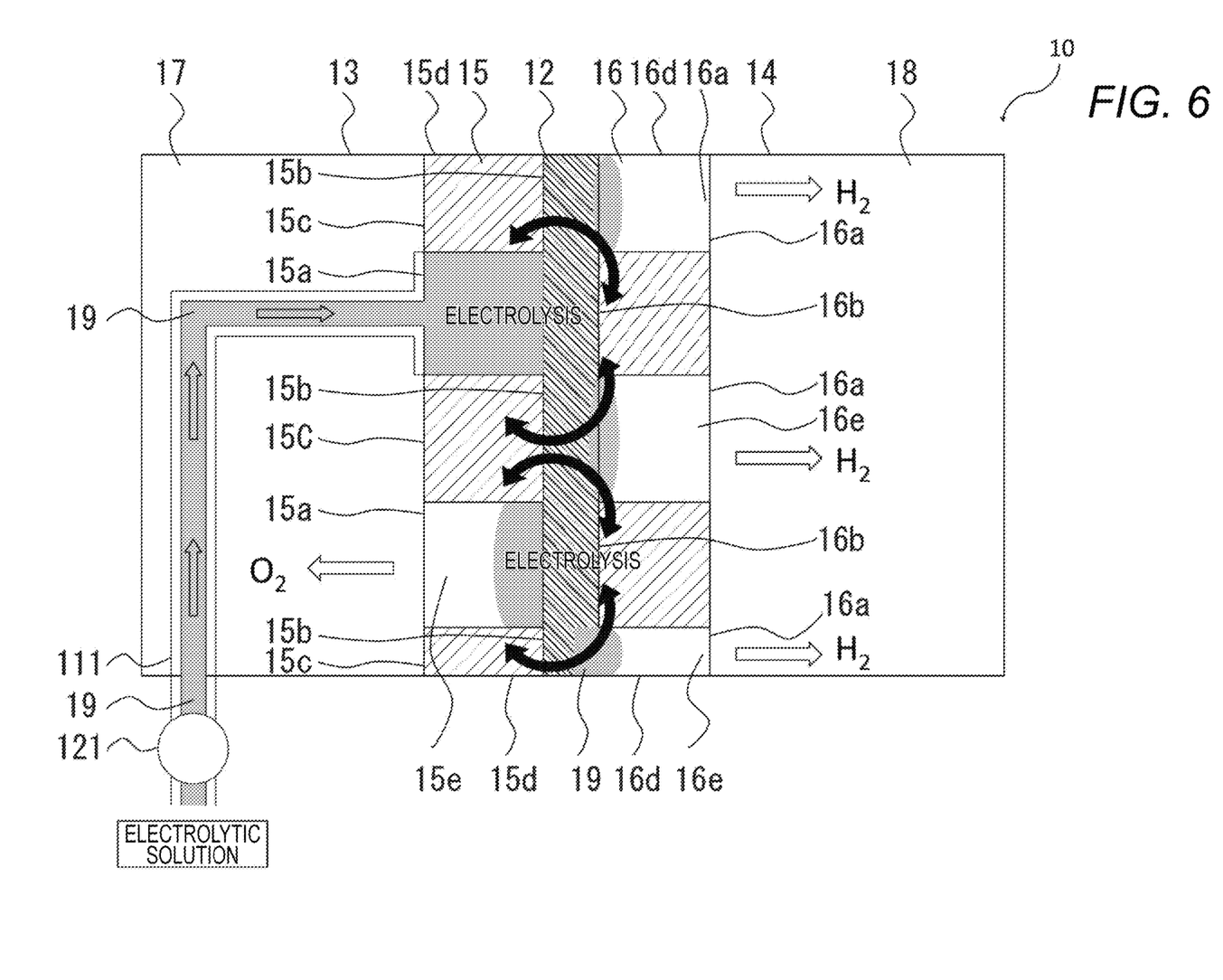
FIG. 6 is an enlarged cross-sectional view of another example of the electrolytic cell in the hydrogen production apparatus according to the present embodiment to explain an operating principle for the electrolytic cell.

FIG. 6 is a cross-sectional view of another example of a configuration and operating principle of the electrolytic cell 10 included in the hydrogen production apparatus 100 according to the present embodiment shown in FIG. 5. Like the electrolytic cell 10 shown in FIG. 5, the electrolytic cell 10 includes the housing 11, the diaphragm 12 as a porous film, the anode-side cell 13, the cathode-side cell 14, the anode electrode 15, the cathode electrode 16, the anode-side space 17, the cathode-side space 18, the electrolytic solution 19, the pipe 111, and the pump 121.

The configuration of another example of the electrolytic cell 10 shown in FIG. 6 is different from the configuration of the electrolytic cell 10 shown in FIG. 5, and the anode openings 15a and the cathode openings 16a are configured so as not to overlap each other with the diaphragm therebetween. For example, the second anode surface 15c of the anode electrode 15 is adjacent to the cathode openings 16a of the cathode electrode 16 in an overlapping manner with the diaphragm 12 therebetween. Similarly, for example, the second cathode surface 16c of the cathode electrode 16 is adjacent to the anode openings 15a of the anode electrode 15 in an overlapping manner with the diaphragm 12 therebetween. Specifically, in view of a plane perpendicular to the longitudinal side of FIG. 6, the cathode openings 16a of the cathode electrode 16 are located at positions corresponding to the second anode surface 15c of the anode electrode 15, and the anode openings 15a of the anode electrode 15 are located at positions corresponding to the second cathode surface 16c of the cathode electrode 16. In other words, in view of the plane perpendicular to the longitudinal side of FIG. 6 (that is, a projection plane parallel to the diaphragm 12), the anode electrode 15 and the cathode electrode 16 are arranged with the anode openings 15a and the cathode openings 16a shifted from each other.

Next, operations of the hydrogen production apparatus 100 according to the present embodiment will be described hereinafter.

As shown in FIG. 1, the electrolytic solution 19 is injected into the electrolytic solution tank 102. Initially the electrolytic solution 19 is not injected into the anode-side cell 13 and the cathode-side cell 14, and the space 17 in the anode-side cell 13 and the space 18 in the cathode-side cell 14 are both set in the gas phases. The electrolytic solution 19 passes through the pipe 111 and is injected into the first anode holes 15e that are at least some of the anode openings 15a opened to the second anode surface 15c.

In the electrolytic cell 10 provided in the hydrogen production apparatus 100 according to the present embodiment shown in FIGS. 5 and 6, the electrolytic solution 19 injected into the first anode holes 15e reaches the cathode electrode 16 through the diaphragm 12 between the anode electrode 15 and the cathode electrode 16. Thus, both the anode electrode 15 and the cathode electrode 16 contact the electrolytic solution 19.

The pipe 111 is connected between some of the anode openings 15a opened in the second anode surface 15c on the surface of the anode electrode 15 and the electrolytic solution tank 102. There is a pump 121 interposed in the middle of the pipe 111.

Further, the electrolytic solution 19 is supplied from the electrolytic solution tank 102 through the pipe 111 to some of the first anode holes 15e that are at least some of the anode openings 15a opened in the second anode surface 15c of the surfaces of the anode electrode 15. The generated oxygen gas is discharged from the first anode holes 15e.

However, the generated oxygen gas may stagnate in the first anode holes 15e and may block supplying of the electrolytic solution 19. Therefore, in a case injecting the electrolytic solution 19 from the first anode holes 15e, setting the flow rate of the electrolytic solution 19 to a specific value or more to prevent the resultant oxygen gas from stagnating in the first anode holes 15e is performed. Thereby the flow path would be rectified and the block of the electrolytic solution 19 would unlikely be occurred, so an increased efficiency of electrolysis could be obtained.

Here, when the area of overlapping between the anode openings 15a of the anode electrode 15 into which to inject the electrolytic solution 19 and the cathode openings 16a of the cathode electrode 16 with the diaphragm 12 therebetween is large, the amount of the electrolytic solution 19 oozing out from the cathode openings 16a of the cathode electrode 16 into the cathode-side gas phase 18 becomes large.

In another example of the electrolytic cell 10 provided in the hydrogen production apparatus 100 according to the embodiment shown in FIGS. 5 and 6, the electrolytic solution 19 injected from the first anode holes 15e that are at least some of the anode openings 15a opened in the second anode surface 15c of the anode electrode 15 reaches the cathode electrode 16 through the diaphragm 12 between the anode electrode 15 and the cathode electrode 16. Thus, both the anode electrode 15 and the cathode electrode 16 contact the electrolytic solution 19.

The other example of the electrolytic cell 10 shown in FIG. 6, which is unlike the electrolytic cell 10 shown in FIG. 5, is configured such that the anode openings 15a and the cathode openings 16a do not overlap each other with the diaphragm therebetween. In this case, when the electrolytic solution 19 is injected into the first anode holes 15e, the amount of the electrolytic solution 19 oozing out from the cathode openings 16a of the cathode electrode 16 into the cathode-side gas space 18 becomes small.

In this case, as shown in FIGS. 5 and 6, the electrolytic solution 19 oozes out to the vicinity of the interface between the anode electrode 15 and the space 17 through the pores 12a of the diaphragm 12 and the anode openings 15a of the anode electrode 15. Similarly, the electrolytic solution oozes out to the vicinity of the interface between the cathode electrode 16 and the space 18 through the pores 12a of the diaphragm 12 and the cathode openings 16a of the cathode electrode 16. Thus, both the anode electrode 15 and the cathode electrode 16 contact the electrolytic solution 19.

In this state, as shown in FIG. 1, when the rectifier 101 is supplied with power from the outside, the rectifier 101 supplies direct-current power between the anode electrode 15 and the cathode electrode 16. Accordingly, the following reaction occurs between the anode electrode and the cathode electrode 16 in the electrolytic solution 19.

$$2OH^- \rightarrow (\tfrac{1}{2})O_2 + H_2O + 2e^- \quad \text{Anode side:}$$

$$2H_2O + 2e^- \rightarrow H_2 + 2OH^- \quad \text{Cathode side:}$$

As a result, the water is electrolyzed so that water (H2O) and an oxygen gas (O2) are generated in the anode-side cell 13, and water is consumed and a hydrogen gas (H2) is generated in the cathode-side cell 14. The generated oxygen gas diffuses into the anode-side space 17 via the anode openings 15a of the anode electrode 15, and moves to the upper part of the anode-side cell 13. The generated hydrogen gas diffuses into the cathode-side space 18 via the cathode openings 16a of the cathode electrode 16, and moves to the upper part of the cathode-side cell 14.

A cleaning liquid, for example, pure water is injected into the oxygen gas cleaning tower 103 and the hydrogen gas cleaning tower 104. The oxygen gas generated in the anode-side cell 13 is drawn into the oxygen gas cleaning tower 103 via the pipe 115, then further cleared of the electrolytic solution 19 by contact with the cleaning liquid, and then discharged to the outside of the hydrogen production apparatus 100 via the pipe 116.

On the other hand, the hydrogen gas generated in the cathode-side cell 14 is drawn into the hydrogen gas cleaning tower 104 via the pipe 117, then cleared of impurities by contact with the cleaning liquid, and then supplied to the compressor 105 via the pipe 118. The compressor 105 compresses the hydrogen gas and supplies the same to the hydrogen storage tank 106 via the pipe 119. The hydrogen storage tank 106 stores the hydrogen gas.

In the electrolysis process, the electrolytic solution 19 may ooze out from the anode openings 15a of the anode electrode 15, drop down along the second anode surface 15c of the anode electrode 15, and accumulate at the bottom of the anode-side cell 13. The electrolytic solution 19 accumulated at the bottom of the anode-side cell 13 drops into the electrolytic solution tank 102 via the pipe 113. Similarly, the electrolytic solution 19 may ooze out from the cathode openings 16a of the cathode electrode 16, drop down along the second cathode surface 16c of the cathode electrode 16, and accumulate at the bottom of the cathode-side cell 14. The electrolytic solution 19 accumulated at the bottom of the cathode-side cell 14 drops into the electrolytic solution tank 102 via the pipe 114. If the electrolytic solution tank 102 cannot be disposed below the electrolytic cell 10, a pump may be provided in the middle of the pipe 113 and the pipe 114 to forcibly move the electrolytic solution 19.

In the present embodiment, when water is electrolyzed, the water is consumed and the electrolytic solution 19 is concentrated. This may increase the concentration of an aqueous potassium hydroxide solution in the electrolytic solution 19 to decrease the electrolysis efficiency. The electrolytic solution 19 oozing out from the anode openings 15a of the anode electrode 15 and the cathode openings 16a of the cathode electrode 16 is higher in the concentration of the aqueous potassium hydroxide solution than the electrolytic solution 19 present in the electrolytic solution tank 102. Thus, the electrolytic solution tank 102 may have a function of adjusting the concentration of the electrolytic solution 19 to be constant so that the electrolytic solution tank 102 can adjust the concentration of the aqueous potassium hydroxide solution in both the electrolytic solution 19 collected from the pipes 113 and 114 and the electrolytic solution 19 in the electrolytic solution tank 102.

According to the embodiment, the flow path for injecting the electrolytic solution 19 and the flow path for discharging the oxygen gas resulting from the electrolysis of the electrolytic solution 19 are different, which makes it possible to suppress the oxygen from being mixed into the electrolytic solution 19. In addition, even if a small amount of oxygen is mixed in the electrolytic solution 19, it is possible to prevent the oxygen in the electrolytic solution 19 from being mixed into the hydrogen gas because the cathode-side cell 14 has the space 18 which can separate the hydrogen gas from the electrolytic solution 19. As a result, a hydrogen gas with improved purity can be obtained.

Comparative Example

Next, a comparative example will be described hereinafter.

Figure 7:
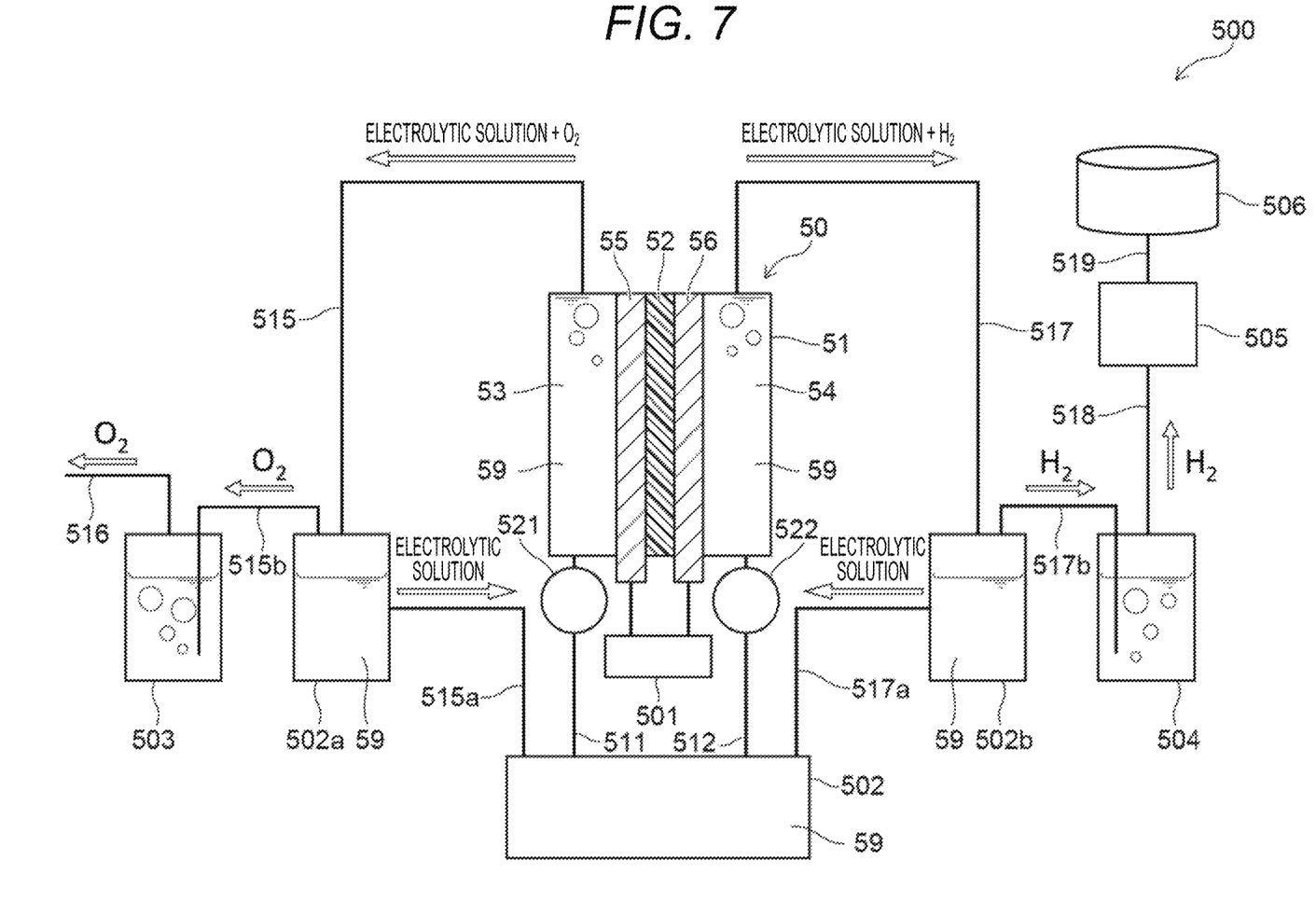
FIG. 7 is a configuration block diagram of a hydrogen production apparatus according to a comparative example.

FIG. 7 is a configuration block diagram of a hydrogen production apparatus according to a comparative example.

As shown in FIG. 7, the hydrogen production apparatus 500 according to the comparative example includes: a housing 51, a diaphragm 52, an anode-side cell 53, a cathode-side cell 54, an anode electrode 55, a cathode electrode 56, an electrolytic solution 59, a rectifier 501, an electrolytic solution tank 502, an oxygen gas cleaning tower 503, a hydrogen gas cleaning tower 504, a compressor 505, a hydrogen storage tank 506, pipes 511, 512, 515, 515a, 515b, 516, 517, 517a, 517b, 518, and 519, and pumps 521 and 522.

The housing 51, the diaphragm 52, the anode electrode 55, the cathode electrode 56, the electrolytic solution 59, the rectifier 501, the electrolytic solution tank 502, the oxygen gas cleaning tower 503, the hydrogen gas cleaning tower 504, the compressor 505, the hydrogen storage tank 506, the pipes 516 to 519 of the hydrogen production apparatus 500 according to the comparative example are similar to the housing 11, the diaphragm 12, the anode electrode 15, the cathode electrode 16, the electrolytic solution 19, the rectifier 101, the electrolytic solution tank 102, the oxygen gas cleaning tower 103, the hydrogen gas cleaning tower 104, the compressor 105, the hydrogen storage tank 106, and the pipes 116 to 119 of the hydrogen production apparatus 100 according to the embodiment.

The hydrogen production apparatus 500 of the comparative example is different from the hydrogen production apparatus 100 according to the embodiment in that the anode-side cell 53, the cathode-side cell 54, the anode-side electrolytic solution tank 502a, the cathode-side electrolytic solution tank 502b, and the pipes 511, 512, 515, 515a, 515b, 517a, and 517b, and the pumps 521 and 522 are provided, and that the anode-side cell 53 and the cathode-side cell 54 are filled with the electrolytic solution 59. In the comparative example shown in FIG. 7, the anode-side cell 53 and the cathode-side cell 54 are entirely filled with the electrolytic solution 59.

However, the anode-side cell 53 and the cathode-side cell 54 sometimes may not be entirely filled with the electrolytic solution 59. In this case, a small amount of gas may exist in the cathode-side cell 54 and in the anode-side cell 53 although the most part of the surface of the cathode electrode 56 and the most part of the surface of the anode electrode 55 are adjacent to the electrolytic solution 59.

The pipe 511 is connected between the anode-side cell 53 and the electrolytic solution tank 502. The pump 521 is interposed in the middle of the pipe 511. The pipe 512 is connected between the cathode-side cell 54 and the electrolytic solution tank 502. The pump 522 is interposed in the middle of the pipe 512.

In order to distinguish from the hydrogen production apparatus 500 according to the present comparative example, the hydrogen production apparatus 100 according to the present embodiment is configured such that the anode-side cell 13 is filled with the anode-side gas phase 17, and the volume of the cathode-side cell 14 is filled with the cathode-side gas phase 18.

The oxygen gas generated in the anode-side cell 53 and the electrolytic solution 59 are drawn into the anode-side electrolytic solution tank 502a through the pipe 515. The electrolytic solution 59 is drawn into the electrolytic solution tank 502 from the anode-side electrolytic solution tank 502a through the pipe 515a. The oxygen gas is drawn into the oxygen gas cleaning tower 503 from the anode-side electrolytic solution tank 502a through the pipe 517b.

The hydrogen gas generated in the cathode-side cell and the electrolytic solution 59 are drawn into the cathode-side electrolytic solution tank 502b through the pipe 515. The electrolytic solution 59 is drawn into the electrolytic solution tank 502 from the cathode-side electrolytic solution tank 502b through the pipe 517a. The hydrogen gas is drawn into the hydrogen gas cleaning tower 504 from the cathode-side electrolytic solution tank 502b through the pipe 517b.

In the electrolytic cell 50, the anode-side cell 53 and the cathode-side cell 54 are partitioned by the diaphragm 52, and the electrolytic solution 59 is held in both the anode-side cell 53 and the cathode-side cell 54. Then, the electrolytic solution 59 drops from the anode-side cell 53 and the cathode-side cell 54 to the same electrolytic solution tank 502, and the electrolytic solution 59 is supplied from the electrolytic solution tank 502 to the anode-side cell 53 and the cathode-side cell 54. That is, the flow path for circulating the electrolytic solution 59 to the anode-side cell 53 and the flow path for circulating the electrolytic solution 59 to the cathode-side cell 54 share one electrolytic solution tank 502.

Accordingly, the oxygen gas mixed in the electrolytic solution 59 in the anode-side cell 53 flows into the cathode-side cell 54 via the electrolytic solution tank 502. As a result, the oxygen gas is mixed into the hydrogen gas generated in the cathode-side cell 54 so that the purity of the hydrogen gas is lowered.

Reducing the circulating flow rate of the electrolytic solution 59 would suppress the inflow amount of the oxygen gas. In this case, however, the effect of peeling off the air bubbles of the hydrogen gas attached to the cathode electrode 56 from the cathode electrode 56 will decrease to lower the efficiency of producing hydrogen. For this reason, even if the density of the current to be put into the electrolytic cell is increased, it is not possible to generate an amount of hydrogen corresponding to the current density. In the present embodiment, the flow path for injecting the electrolytic solution 19 and the flow path for discharging the oxygen gas resulting from the electrolysis of the electrolytic solution 19 are different, which makes it possible to suppress the oxygen from being mixed into the electrolytic solution 19.

In contrast, according to the present embodiment shown in FIG. 1, the flow path for injecting the electrolytic solution 19 and the flow path for discharging the oxygen gas generated by electrolysis of the electrolytic solution 19 are different. Thus, even if the circulating flow rate of the electrolytic solution 59 is increased, it is possible to generate a high-purity hydrogen gas. Accordingly, as compared with the electrolytic cell 50 shown as the comparative example in FIG. 7, it is possible to generate hydrogen with efficiency even when the density of the current to be put into the electrolytic cell 10 is increased.

For example, the hydrogen production apparatus 100 according to the present embodiment may be installed adjacent to a power generation facility using renewable energy, such as a wind power generation facility or a solar power generation facility. Renewable energy, unlike fossil fuels, is sustainable and generally does not generate carbon dioxide during power generation, and thus has attracted attention as a future energy source. However, power generation using renewable energy often has temporal variations in power generation amount.

For example, in the case of a wind power generation facility, the power generation amount varies depending on the wind, and in the case of a solar power generation facility, the power generation amount varies depending on the amount of solar radiation.

Therefore, electricity generated by renewable energy is input to a hydrogen production apparatus to produce hydrogen, and the hydrogen is stored in the hydrogen storage tank 106 and is recovered and converted into electricity by a fuel cell as necessary. This eliminates the need to match the time of power generation and the time of use, and allows renewable energy to be used efficiently.

As mentioned above, increasing the circulating flow rate of the electrolytic solution in the hydrogen production apparatus makes it possible to, when the amount of power generation temporarily increases, for example, when strong wind blows or solar radiation becomes strong, produce hydrogen by efficiently using the generated large current.

Thus, structuring a system in which the hydrogen production apparatus 100 according to the present embodiment is combined with a power generation facility using renewable energy makes it possible to efficiently recover the renewable energy.

Power generation using renewable energy has a risk that the production purity of a hydrogen gas may decrease if the amount of power generation varies or decreases over time. In the present embodiment, in such a case, it is possible to suppress the power consumption required for the production of a hydrogen gas as compared with the conventional case, and to suppress the decrease in the production purity of the hydrogen gas.

(Modification)

Figure 8:
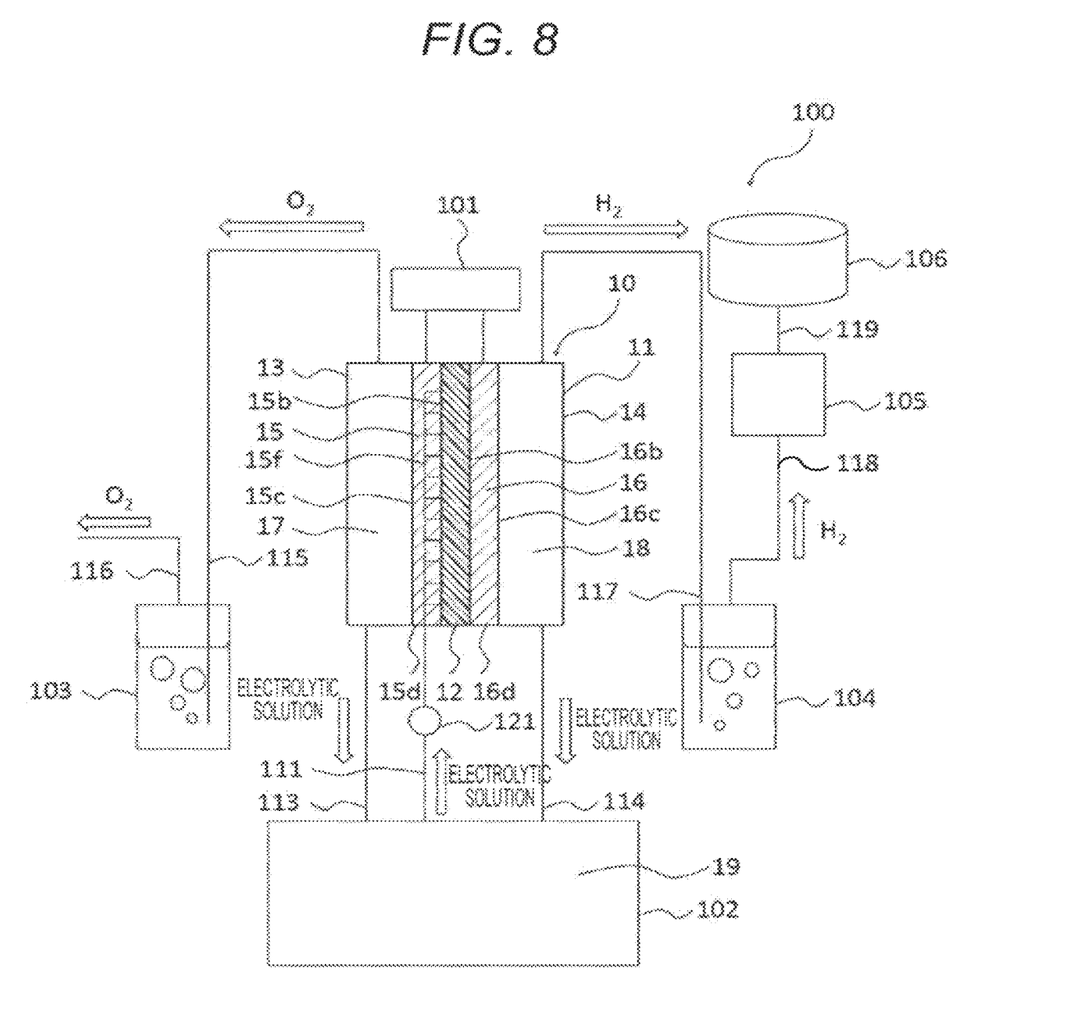
FIG. 8 is a configuration block diagram of a hydrogen production apparatus according to a modification of the present embodiment.
Figure 9:
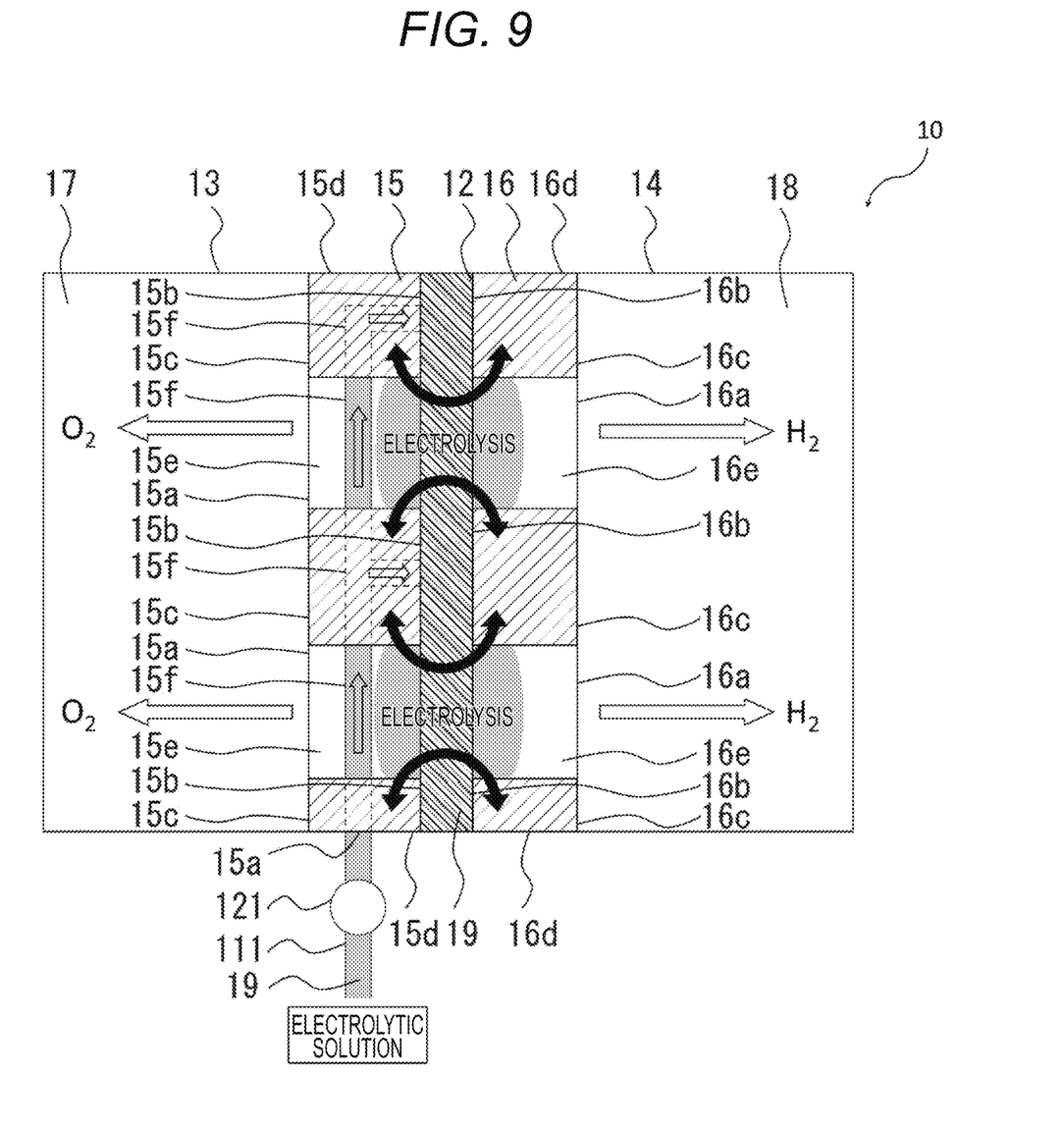
FIG. 9 is an enlarged cross-sectional view of an electrolytic cell in the hydrogen production apparatus according to the modification of the present embodiment to explain an operating principle for the electrolytic cell.

FIG. 8 is a configuration block diagram of a hydrogen production apparatus according to a modification of the present embodiment, and FIG. 9 is a cross-sectional view showing a configuration and operating principle of the electrolytic cell 10 of the hydrogen production apparatus 100 according to this modification.

In this modification, in addition to the configuration of the first embodiment shown in FIGS. 1, 5, and 6, the anode electrode 15 further includes second anode holes 15$f$ as some of the anode openings 15$a$.

In the configuration shown in FIG. 8, the anode electrode 15 includes the second anode holes 15$f$ as some of the anode openings 15$a$. Instead of the second anode holes 15$f$ of the anode electrode 15, the cathode electrode 16 may further include second cathode holes 16$f$ as some of the cathode openings 16$a$. Alternatively, the anode electrode 15 may include the second anode holes 15$f$ as some of the anode openings 15$a$ and the cathode electrode 16 may include second cathode holes not shown as some of the cathode openings 16$a$.

In FIG. 8, the second anode hole 15$f$ constitutes another part of the anode opening 15$a$, and one end opens to the first anode surface 15$b$ and the other end opens to the anode end surface 15$d$.

That is, the anode electrode 15 includes a first anode hole 15$e$ and a second anode hole 15$f$, which are at least some of the anode openings 15$a$. Each of the first anode hole 15$e$ and the second anode hole 15$f$ is preferably provided in plural (many) in the anode electrode 15.

A pipe 111 is connected between the anode opening 15$a$ to the anode end surface 15$d$ of the second anode hole 15$f$ and the electrolytic solution tank 102. There is a pump 121 interposed in the middle of the pipe 111.

That is, among the anode openings 15$a$ of the anode electrode 15, the second anode holes 15$f$ constitute supply pipes that supply the electrolytic solution 19 from the electrolytic solution tank 102 through the pipe 111 to the diaphragm 12 as a porous body, and the first anode holes 15$e$ constitute discharge pipes that discharge the oxygen generated from the electrolytic solution 19 that has been supplied to the diaphragm 12 between the anode electrode 15 and the cathode electrode 16 and subjected to electrolysis, together with some associated electrolytic solution 19.

As shown in FIG. 9, the electrolytic solution 19 is supplied from the electrolytic solution tank 102 through the pipe 111 to the second anode holes 15$f$ that are at least some of the anode openings 15$a$ opened in the anode end surface 15$d$. The electrolytic solution 19 injected from the second anode holes 15$f$ reaches the cathode electrode 16 through the diaphragm 12 between the anode electrode 15 and the cathode electrode 16. T Thus, both the anode electrode 15 and the cathode electrode 16 contact the electrolytic solution 19 to allow electrolysis. The oxygen gas generated by the electrolysis is discharged from the first anode holes 15$e$ that are at least some of the anode openings 15$a$ opened in the second anode surface 15$c$. The generated hydrogen gas is discharged from the first cathode holes 16$e$ that are at least some of the first cathode openings 16$a$ opened in the second cathode surface 16$c$.

The flow path of the second anode holes 15$f$ for injecting the electrolytic solution 19 that are at least some of the anode openings 15$a$ and the flow path of the first anode holes 15$e$ for discharging the oxygen gas are different, and thus the electrolytic solution 19 and the oxygen gas are unlikely to be directly mixed. The flow path of the second anode holes 15$f$ for injecting the electrolytic solution 19 can be rectified such that the generated oxygen gas is unlikely to flow therein.

As a result, liquid blockage in the flow path for injecting the electrolytic solution 19 is less likely to occur, and the electrolytic solution 19 can be efficiently supplied to the diaphragm 12 between the anode electrode 15 and the cathode electrode 16. The electrolytic solution 19 is separated from the flow path of an oxygen gas, which makes it possible to prevent oxygen from being mixed into the electrolytic solution 19 and obtain a hydrogen gas with increased purity. As a result, in the present embodiment, it is possible to obtain a hydrogen gas with increased purity of the electrolytic solution.

Some embodiments of the present invention have been described so far. However, these embodiments are shown as examples and are not intended to limit the scope of the invention. These novel embodiments can be implemented in various other forms, and various omissions, replacements, and changes can be made to these embodiments without departing from the spirit of the invention. These embodiments and modifications thereof are included in the scope and gist of the invention, and are included in the scope of the invention described in the claims and the equivalents thereof.

What is claimed is:

1. An electrolytic cell comprising:
   a housing;
   a diaphragm that partitions an interior of the housing into an anode-side cell and a cathode-side cell;
   an anode electrode that is provided in the anode-side cell and has a first anode surface in contact with the diaphragm, a second anode surface in contact with an anode-side gas phase and a plurality of anode holes which penetrate from the first anode surface through to the second anode surface;
   a cathode electrode that is provided in the cathode-side cell and has a first cathode surface in contact with the diaphragm, a second cathode surface in contact with a cathode-side gas phase and a plurality of cathode holes which penetrate from the first cathode surface through to the second cathode surface; and
   a pipe that has one end connected to an electrolytic solution tank which is provided outside of the electrolytic cell and retains an electrolytic solution and an other end directly connected to the anode holes, wherein
   the electrolytic solution is supplied between the anode electrode and the cathode electrode through the pipe from the electrolytic solution tank.

2. The electrolytic cell according to claim 1, wherein the anode holes and the cathode holes are configured so as not to overlap each other with the diaphragm.

3. The electrolytic cell according to claim 2, wherein
   the anode-side cell includes an anode-side space,
   the cathode-side cell includes a cathode-side space, and
   each of the spaces is provided in an opposite side of the electrodes against the diaphragm.

4. The electrolytic cell according to claim 2, wherein the diaphragm is a porous film that allows water molecules and ions to pass through but does not allow air bubbles to pass through.

5. An electrolytic cell comprising:
   a housing;
   a diaphragm that partitions an interior of the housing into an anode-side cell and a cathode-side cell, the anode-side cell being filled with an anode-side gas phase and the cathode-side cell being filled with a cathode-side gas phase;
   an anode electrode that is provided in the anode-side cell and has a first anode surface in contact with the diaphragm, a second anode surface in contact with the anode-side gas phase and a plurality of anode holes which penetrate from the first anode surface through to the second anode surface;
   a cathode electrode that is provided in the cathode-side cell and has a first cathode surface in contact with the diaphragm, a second cathode surface in contact with the cathode-side gas phase and a plurality of cathode holes which penetrate from the first cathode surface through to the second cathode surface; and
   a pipe that has one end connected to an electrolytic solution tank which is provided outside of the electrolytic cell and retains an electrolytic solution and an other end directly connected to the anode holes, wherein
   the electrolytic solution is supplied between the anode-side cell and the cathode-side cell through the pipe from the electrolytic solution tank.

6. The electrolytic cell according to claim 5, wherein the anode holes and the cathode holes are configured so as not to overlap each other with the diaphragm.

7. An electrolytic cell comprising:
   a diaphragm that partitions an anode-side cell and a cathode-side cell;
   an anode electrode that is a plate-like body including a first anode surface, a second anode surface, and an anode end surface formed between an end portion of the first anode surface and an end portion of the second anode surface and is provided in the anode-side cell, the first anode surface being adjacent to the diaphragm;
   a cathode electrode that is a plate-like body including a first cathode surface, a second cathode surface, and a cathode end surface formed between an end portion of the first cathode surface and an end portion of the second cathode surface and is provided in the cathode-side cell, the first cathode surface being adjacent to the diaphragm;
   a first anode hole that is provided in the anode electrode and has one end opened in the first anode surface and the other end opened in the second anode surface;
   a first cathode hole that is provided in the cathode electrode and has one end opened in the first cathode surface and the other end opened in the second cathode surface; and
   a pipe that has one end connected to an electrolytic solution tank which is provided outside of the electrolytic cell and retains an electrolytic solution, and an other end directly connected to the first anode hole, wherein
   the electrolytic solution is supplied between the anode electrode and the cathode electrode through the pipe from the electrolytic solution tank.

8. The electrolytic cell according to claim 7, wherein the anode hole and the cathode hole are configured so as not to overlap each other with the diaphragm.

9. The electrolytic cell according to claim 8, further comprising a second anode hole that is provided in the anode electrode and has one end opened in the first anode surface and the other end opened in the anode end surface.

10. The electrolytic cell according to claim 9, wherein
    the diaphragm is located between the anode electrode and the cathode electrode and is formed of an insulating porous material, and
    the electrolytic solution supplied between the anode electrode and the cathode electrode is movable between the anode electrode and the cathode electrode through a hole in the diaphragm.

11. The electrolytic cell according to claim 8, further comprising a second cathode hole that is provided in the cathode electrode and has one end opened in the first cathode surface and the other end opened in the cathode end surface.

12. The electrolytic cell according to claim 8,
wherein the electrolytic solution is an alkaline aqueous solution and has a mass percent concentration of potassium hydroxide used of 5% (w/w) or more.

13. The electrolytic cell according to claim 8,
wherein at least one of the anode electrode and the cathode electrode has a gyroidal structure or a lattice structure.

14. A hydrogen production apparatus comprising:
an electrolytic solution tank retaining an electrolytic solution;
an electrolytic cell including
  a housing;
  a diaphragm that partitions an interior of the housing into an anode-side cell and a cathode-side cell, the anode-side cell being filled with an anode-side gas phase and the cathode-side cell being filled with a cathode-side gas phase,
  an anode electrode that is provided in the anode-side cell and has a first anode surface in contact with the diaphragm, a second anode surface in contact with the anode-side gas phase and a plurality of anode holes which penetrate from the first anode surface through to the second anode surface,
  a cathode electrode that is provided in the cathode-side cell and has a first cathode surface in contact with the diaphragm, a second cathode surface in contact with the cathode-side gas phase and a plurality of cathode holes which penetrate from the first cathode surface through to the second cathode surface, and
  a pipe that has one end connected to the electrolytic solution tank which is provided outside of the electrolytic cell and retains the electrolytic solution and an other end directly connected to the anode holes;
and
a pump that supplies the electrolytic solution between the anode electrode and the cathode electrode through the pipe from the electrolytic solution tank.

15. The hydrogen production apparatus according to claim 14, further comprising:
a pipe that discharges the electrolytic solution from the electrolytic cell;
a pipe that discharges an oxygen gas from the anode-side cell; and
a pipe that discharges a hydrogen gas from the cathode-side cell.

* * * * *